United States Patent [19]

Aoki et al.

[11] Patent Number: 4,668,050
[45] Date of Patent: May 26, 1987

[54] METHOD OF USING LIQUID CRYSTAL DEVICE COMPRISING DICHROIC DYE AND LIQUID CRYSTAL DEVICE

[75] Inventors: Hisashi Aoki, Tokyo; Kaoru Kodera; Tetsuo Okugawa, both of Toyonaka, all of Japan

[73] Assignees: Casio Computer Co., Ltd., Tokyo; Showa Chemical Co., Ltd., Osaka, both of Japan

[21] Appl. No.: 786,187

[22] Filed: Oct. 10, 1985

Related U.S. Application Data

[62] Division of Ser. No. 604,055, Apr. 26, 1984, abandoned.

[30] Foreign Application Priority Data

May 4, 1983 [JP] Japan ................................ 58-78566

[51] Int. Cl.[4] .......................... G02F 1/13; C09K 19/00
[52] U.S. Cl. ................................ 350/349; 252/299.1; 534/577; 534/752
[58] Field of Search ........... 252/299.1, 299.68, 299.01; 534/577, 752; 350/349, 350 R

[56] References Cited

U.S. PATENT DOCUMENTS 4,565,424  1/1986  Huffman et al. ................. 252/299.1

FOREIGN PATENT DOCUMENTS 57-40559   3/1982  Japan .
58-38756   3/1983  Japan .
58-157863  9/1983  Japan .
60-228568 11/1985  Japan ................................ 252/299.1
1508500    4/1978  United Kingdom .
1546575    5/1979  United Kingdom .
1546803    5/1979  United Kingdom .
1549185    7/1979  United Kingdom .
1547968    7/1979  United Kingdom .

OTHER PUBLICATIONS

Bloom et al, MCLC, vol. 41, 1977, pp. 1-4.
Cognard et al, MCLC, vol. 68, 1981, pp. 207-229.
Journal fur praktische Chemie, 315 [3] pp. 539-548 (1973).
Liquid Crystals Bases and Applications, Akio Sasaki, pp. 207-214, Ohm Inc., 1979, Tokyo.

Primary Examiner—Teddy S. Gron
Assistant Examiner—J. E. Thomas
Attorney, Agent, or Firm—Frishauf, Holtz, Goodman & Woodward

[57] ABSTRACT

A dichroic dye for use in a liquid crystal comprising at least one compound represented by a formula:

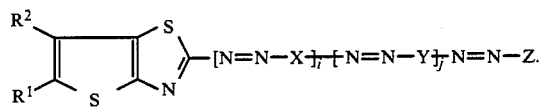

The compound includes monoazo, disazo and trisazo compounds. The dye has a high dichroic ratio, a high mole absorptivity and a good compatibility with liquid crystals.

18 Claims, 3 Drawing Figures

METHOD OF USING LIQUID CRYSTAL DEVICE COMPRISING DICHROIC DYE AND LIQUID CRYSTAL DEVICE

This application is a division of application Ser. No. 604,055, filed Apr. 26, 1984, now abandoned.

BACKGROUND OF THE INVENTION

I. Field of the Invention

The present invention relates to a pleochroic or dichroic dye which is to be dissolved in a liquid crystal for use in a liquid crystal device utilizing the guest-host effect such as a liquid crystal display device or a liquid crystal light valve.

II. Description of the Prior Art

In general, it is desired that a liquid crystal device utilizing the guest-host effect, such as a liquid crystal display device, provide a display of good contrast and have a short response time. Furthermore, it is also desirable that the display color not fade over a long period of time.

The display contrast of a guest-host effect liquid crystal display device is mainly determined by the dichroic ratio of a dichroic dye dissolved in the liquid crystal. The higher the dichroic ratio, the better the contrast. However, even if the dichroic ratio of the dye is high, the display color becomes lighter and a satisfactory display cannot be obtained if the coloring power (mole absorptivity) of the dye itself is low. If the coloring power of the dye is low, the amount of the dye added in the liquid crystal must be increased to obtain a darker display. However, this adversely affects the liquid crystal properties of the liquid crystal molecules and prolongs the response time upon application of a driving voltage. Furthermore, the dichroic dye must have satisfactory compatibility with the liquid crystal. If the dichroic dye has a poor compatibility with the liquid crystal, the dye may precipitate out of the liquid crystal. This precipitation or segregation of the dye is particularly notable at low temperatures. The precipitation causes color irregularities and lowers the quality of the display product.

In order to obtain a desirable guest-host effect liquid crystal device of the type described above, the guest dichroic dye to be dissolved in the host liquid crystal must satisfy the following conditions:

1. The dye must have a high dichroic ratio.
2. The dye must have a high coloring power and be able to provide a dark display color when only a small amount is added in the host liquid crystal.
3. The dye must have an excellent compatibility with the liquid crystal and must not precipitate at low temperatures.

Conventional dichroic dyes include benzene-based azo dyes, stilbene-based dyes, and anthraquinone-based dyes. However, none of these dyes satisfy all these three requirements.

SUMMARY OF THE INVENTION

It is, therefore, an object of the present invention to provide a dichroic dye which can be suitably used in a liquid crystal device utilizing a guest-host effect, which has a high dichroic ratio and a high coloring power, and which has an excellent compatibility with the liquid crystal.

The dichroic dye of the present invention comprises of at least one thieno-[2,3-d]-thiazole compound having the general formula:

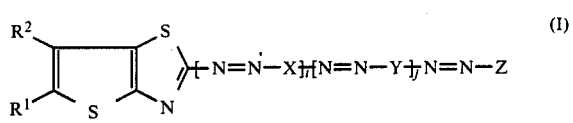

where:

each of X and Y is independently

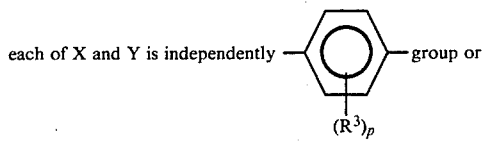

group or

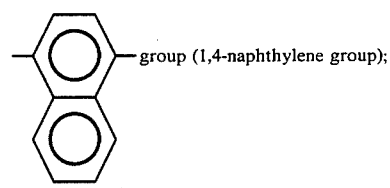

group (1,4-naphthylene group);

Z is 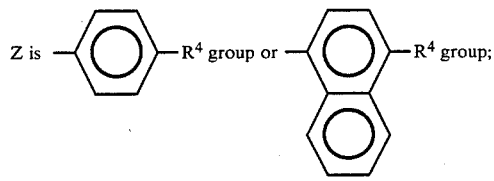 $R^4$ group;

each of $R^1$ and $R^2$ is independently hydrogen atom, a halogen (chlorine, fluorine, bromine or iodine) atom, cyano group, thiocyano group (—SCN), hydroxyl group, mercapto group (—SH), a lower alkyl group, a fluorinated lower alkyl group (a group derived by substituting at least one hydrogen of the lower alkyl group with fluorine atom), a lower alkylsulfonyl group (—SO$_2$—$R^0$), a fluorinated lower alkylsulfonyl group (a group derived by substituting at least one hydrogen of the lower alkylsulfonyl group with fluorine atom), a lower alkoxyl group, a lower alkylthio group (—$SR^0$), —$OR^*$—O—$R^0$ group, —$R^*$—$OR^0$ group, a lower alkylcarbonyl group (—$COR^0$), a lower acyloxy group (—$OCOR^0$), a lower alkoxycarbonyl group (—$COOR^0$),

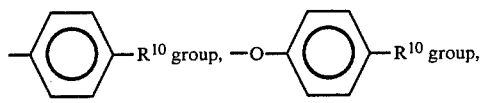

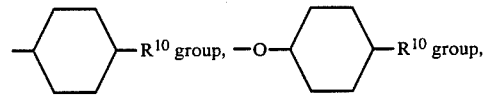

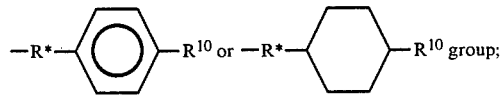

each $R^3$ is independently hydrogen atom, a halogen atom, methyl group, ethyl group, methoxy group, ethoxy group, cyano group or trifluoromethyl group (—CF$_3$);

each R$^4$ is independently

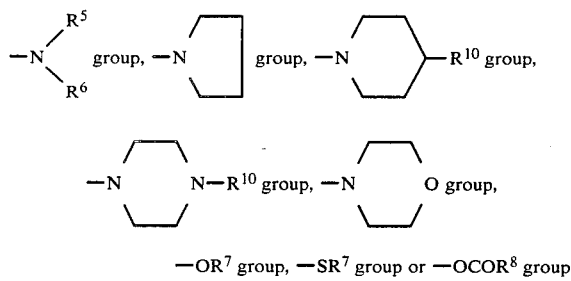

—OR$^7$ group, —SR$^7$ group or —OCOR$^8$ group;

each of R$^5$ and R$^6$ is independently hydrogen atom, a lower alkyl group, lower hydroxyalkyl group (—R*—OH), a halogenated lower alkyl group (a group derived by substituting at least one hydrogen of the lower alkyl group with halogen atom), a cyano-lower alkyl group (—R*—CN), —R*—COOR$^9$ group, —R*—OCOR$^9$ group,

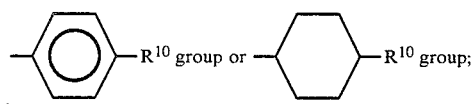

each R$^7$ is independently hydrogen atom, a lower alkyl group,

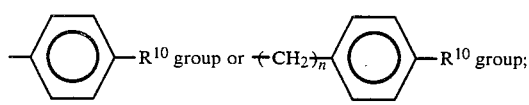

each R$^8$ is independently a lower alkyl group or

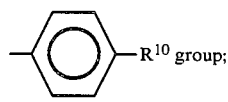

each R$^9$ is independently hydrogen atom or a lower alkyl group;
each R$^{10}$ is independently hydrogen atom, a lower alkyl group or a lower alkoxyl group;
each R$^0$ is independently a lower alkyl group;
each R* is independently a lower alkylene group;
i and j are each 0 or 1;
p is an integer from 1 to 4; and
n is an integer from 1 to 8.

In the specification and the appended claims, the term "lower" referred to a group such as an alkyl, an alkoxyl or an alkylene group means a group having 1 to 8 carbon atoms.

The present invention also relates to a liquid crystal device which uses a liquid crystal material containing the dichroic dye as defined above.

DETAILED DESCRIPTION OF THE PREFERRED EMBODIMENTS

Figure 1:
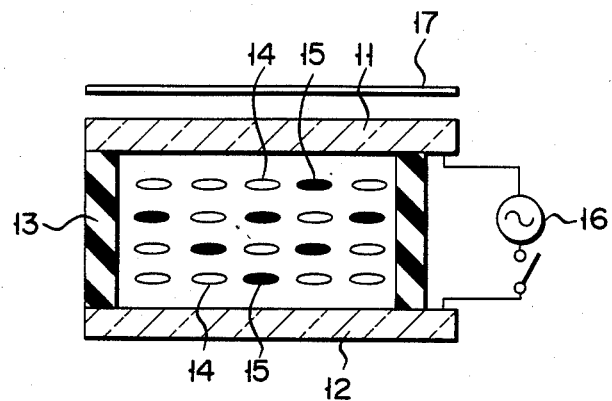
FIG. 1 is a representation showing a negative contrast guest-host effect liquid crystal display device.

As apparent from the definitions of the formula (I) given above, the dichroic dye of the present invention includes a monoazo compound having the formula:

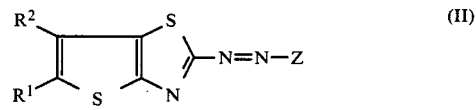

a disazo compound having the formula:

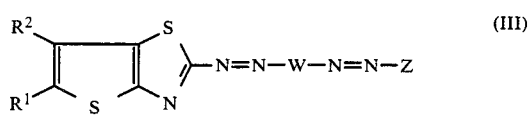

wherein W is X or Y as defined above, and a trisazo compound having the formula:

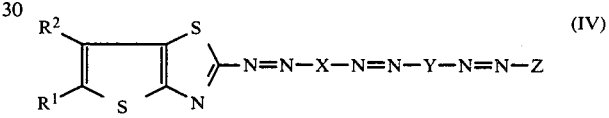

In the formulae (I) to (IV), R$^1$ is preferably hydrogen atom, a halogen atom, cyano group, a lower alkyl group, a fluorinated lower alkyl group or

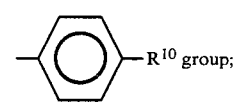

R$^2$ and R$^3$ are preferably each hydrogen atom; and R$^4$ is preferably

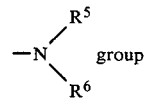

or —OR$^7$ group or

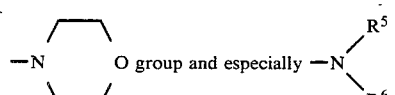

or —OR$^7$. Each of R$^5$ and R$^6$ is preferably a lower alkyl group or a cyano-lower alkyl group. R$^7$ is preferably a lower alkyl group.

The dye of the present invention is preferably a disazo compound having the formula (III) or a trisazo compound having the formula (IV). In the case of a disazo dye, it is particularly preferable that W is a 1,4-phenylene group () and Z is a  R⁴ group; or W is 1,4-naphthylene group (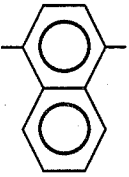) and Z is 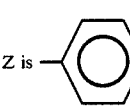 R⁴ group.

In the case of a trisazo compound, it is particularly preferable that X and Y are respectively 1,4-phenylene groups and Z is

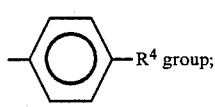 R⁴ group;

or X is 1,4-phenylene group, Y is a 1,4-naphthylene group and Z is a

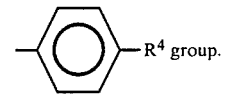

Thus, a particularly preferable dichroic dye of the present invention has one of the following formulae:

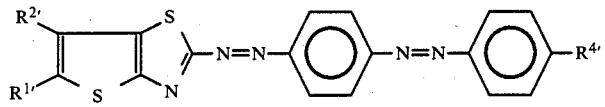 (V)

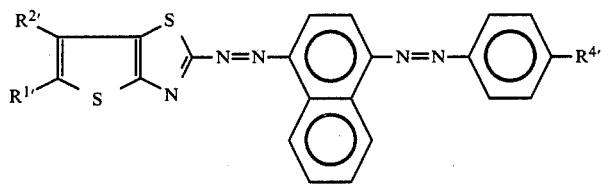 (VI)

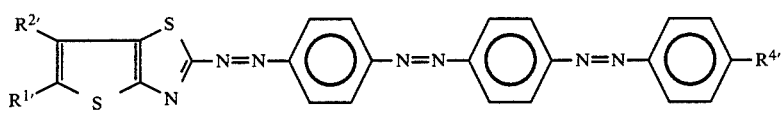 (VII)

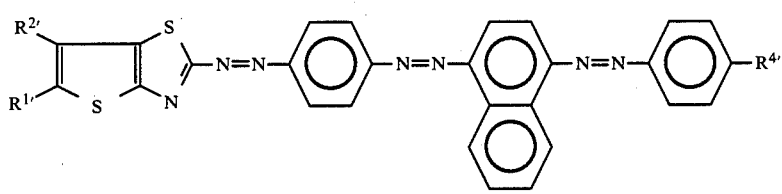 (VIII)

In the formulae (V) to (VIII), $R^{1\prime}$, $R^{2\prime}$ and $R^{4\prime}$ are respectively the preferred $R^1$, $R^2$ and $R^4$ groups mentioned above.

The dichroic dye compound of the present invention can be prepared initially by diazotizing a 2-aminothieno-[2,3-d]-thiazole compound having the formula:

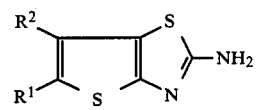 (IX)

The diazotization can be performed by reacting, while cooling with ice, about equimolar amounts of the thienothiazole compound of the formula (IX) and a diazotizing agent such as nitrosylsulfuric acid or sodium nitrite in a mineral acid such as sulfuric acid or phosphoric acid, or in an organic acid such as acetic acid or acetic/propionic acid mixture. Then, a corresponding thienothiazole diazonium salt is produced. The diazonium salt need not be separated from the reaction mixture and the diazotized reaction mixture is used in the next coupling step.

A monoazo compound of the formula (II) is obtained by reacting the above-noted reaction mixture containing the thienothiazole diazonium salt with a coupling component having the formula H—Z (where Z has the same meaning as defined above) in acetic acid or a mixture thereof with propionic acid. This coupling reaction is performed at a relatively low temperature of −30° C. to 15° C. for 1 hour to 3 hours. An excess amount of the coupling component is preferably used with respect to the diazo component. Usually, 2 to 4 moles of the coupling component is used per mole of the diazo component.

When an aromatic primary amine such as aniline is used as a coupling component in this reaction or subsequent stage coupling reactions described below, the diazoamino compound is produced in a greater amount than the desired aminoazo compound. That is, when aniline is used as a coupling agent, coupling is performed more easily on the amino group than on the carbon atom at the para position with respect to the amino group of aniline. In view of this, in order to obtain the desired aminoazo compound at a high yield, as will be described in detail in Example 9 or 11, the amino group of aniline used is protected by sodium methanesulfonate or the like so that coupling on the carbon atom at the para position to the amino group of aniline proceeds preferentially. After the coupling reaction is terminated, the reaction mixture is heated (e.g., to between 60° C. and 90° C.) in, for example, an alkaline medium (e.g., sodium hydroxide aqueous solution) so as to separate the protective group. If α-naphthylamine is used as the coupling agent, the above problem is obviated.

A disazo compound having the formula (III) can be obtained as follows. First, a coupling reaction is conducted between a reaction mixture containing thienothiazole diazonium salt as described above and a primary amine having the formula H—W—NH$_2$ (where W has the same meaning as defined above). The coupling conditions are the same as those in the preparation of the monoazo compound. Upon this coupling reaction, an aminoazo compound having the following formula is obtained:

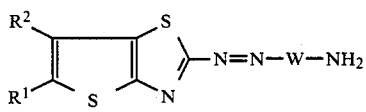

The resultant aminoazo compound is subjected to diazotization in the same manner as in the preparation of the thienothiazole diazonium salt. Subsequently, the diazonium salt is coupled with a coupling component having the formula H—Z. This coupling is performed in a similar manner to that described with reference to the preparation of the monodiazo compound. In this manner, a disazo compound having the formula (III) is obtained.

A trisazo compound having the formula (IV) is obtained by coupling the thienothiazole diazonium salt with a primary amine having the formula H—X—NH$_2$ (where X has the same meaning as defined above), subjecting the resultant aminoazo compound to diazotization, coupling the diazonium salt with a primary amine having the formula H—Y—NH$_2$ (where Y has the same meaning as defined above), subjecting the resultant aminodisazo compound to diazotization, and coupling the diazonium compound with a coupling component having the formula H—Z. The diazotization in each different step of this process can be performed in the same manner as that described above.

In each case, the final product can be refined with a silica gel column or by recrystallization. A thienothiazole compound having the formula (IX) as a starting material of the dichroic dye of the present invention and a method of preparing the same are disclosed in Journal fur praktische Chemie, 315 [3], pp. 539–548 (1973) and British Pat. No. 1,549,185, or the compound (IX) can be prepared by modifying the methods described in these literatures. Incidentally, the coupling component

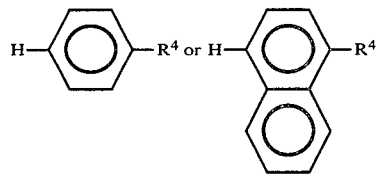

wherein R$^4$ is —OR$^7$ (where R$^7$ is other than hydrogen) or —SR$^7$ (where R$^7$ is other than hydrogen) cannot couple with the diazonium salt. In such a case,

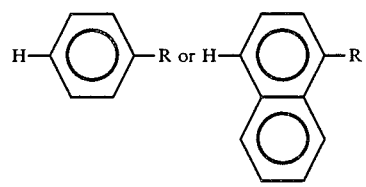

(where R is —OH or —SH) is first coupled with the diazonium salt to obtain a corresponding diazo compound, and the diazo compound is alkylated, esterified or correspondingly modified according to a method known per se to obtain a desired product.

The present invention will now be described by way of its examples.

EXAMPLE 1

4.24 grams (0.02 mole) of 2-amino-5-n-butyl-thieno-[2,3-d]-thiazole having the formula:

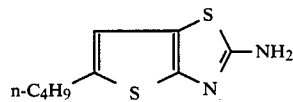

were added to 40 ml of 85% phosphoric acid solutin and the mixture was heated to 70° C. to prepare a solution. After the solution was cooled to −5° C. to 0° C., 5.9 grams of 43% by weight nitrosylsulfuric acid solution were added dropwise over 30 minutes. After the addition of the nitrosylsulfuric acid was completed, the resultant reaction mixture was stirred at −5° C. to 0° C. for 1 hour to complete diazotization.

Meanwhile, 8.82 grams (0.06 mole) of N-phenylpyrolidine (coupling component) were dissolved in 100 ml of mixture of acetic acid and propionic acid in a weight ratio of 1:1 to prepare a coupling component solution. The above prepared diazo compound was added to the coupling component solution dropwise over 40 minutes under stirring at −5° C. to 0° C. and the mixture was thereafter stirred at −5° C. to 0° C. for 2 hours. Thereafter, the reaction mixture was poured into 300 ml of iced water. The precipitate was filtered, rinsed with water, and was vacuum-dried. Two grams of the obtained crude monoazo compound were dissolved in 50 ml of chloroform. Twenty grams of alumina powder were added to the obtained solution under stirring, and the mixture was filtered and rinsed with chloroform. Subsequently, the mother liquor was concentrated to the amount of 30 ml, and the concentrated solution was then purified by chromatography using a column having an inner diameter of 3 cm and a length of 30 cm and having about 120 grams of 300-mesh silica gel filled therein, and chloroform as an elution medium. The eluate obtained was dried and was subjected twice to recrystallization from the mixture of chloroform with methanol to obtain the desired dichroic dye.

EXAMPLES 2 to 5

The same procedures as in Example 1 were followed to prepare respective dichroic dyes except that the starting materials had the compositions shown in Table 1 below.

TABLE 1

| Example No. | Thienothiazole compound | Coupling component (H—Z) |
|---|---|---|
| 2 | 2-amino-5-propyl-thieno-[2,3-d]-thiazole | N,N—diethylaniline |
| 3 | same as in Example 1 | same as in Example 2 |
| 4 | same as in Example 1 | Phenol, followed by ethylation |
| 5 | 2-amino-5-benzyl-thieno-[2,3-d]-thiazole | same as in Example 2 |

EXAMPLE 6

(A) 4.24 grams (0.02 mole) of 2-amino-5-n-butyl-thieno-[2,3-d]-thiazole were diazotized as in Example 1. The resultant diazo compound was added dropwise at 10° C. over 30 minutes under stirring to a solution obtained by dissolving 8.58 grams (0.06 mole) of α-naphthylamine in 150 ml of acetic acid. Stirring was continued for another 2 hours. The resultant reaction mixture was poured into 400 ml of iced water. The precipitate was filtered and was rinsed with water. The obtained cake was added to a 4% sodium carbonate aqueous solution, the mixture was stirred for 30 minutes, and was vacuum-dried to provide 6.8 grams of a crude aminomonoazo compound having the formula:

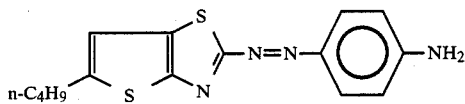

(B) Three grams of the aminomonoazo compound were added to 300 ml of a mixture of acetic acid with propionic acid in a weight ratio of 1:1. 2.4 grams of 43% nitrosylsulfuric acid solution was added to the resultant mixture at −10° C. to −5° C. under stirring. Stirring was continued for another hour. The diazo compound obtained was added dropwise at −5° C. to 0° C. to a solution obtained by dissolving 6.2 grams of N,N-diethylaniline in 100 ml of a mixture of acetic acid with propionic acid in a weight ratio of 1:1. Stirring at this temperature was performed for another 2 hours. 150 ml of iced water were added to the reaction mixture, the precipitate was filtered, rinsed with water, and vacuum-dried to provide a crude disazo compound. 2 grams of the obtained crude disazo compound was purified as in Example 1 to provide 0.4 gram of the desired dichroic dye.

EXAMPLE 7

The same procedures as in Example 6 were followed except that the 2-aminothienothiazole used to prepare the desired dichroic dye was 2-amino-5-propyl-thieno-[2,3-d]-thiazole.

EXAMPLE 8

The same procedures as in Example 6 were followed except that the 2-aminothienothiazole used to prepare the described dichroic dye was 2-amino-5-benzyl-thieno-[2,3-d]-thiazole.

EXAMPLE 9

The same procedures as in Example 6 were followed except that the 2-aminothienothiazole used was 2-amino-5-cyano-thieno-[2,3-d]-thiazole.

EXAMPLE 10

The same procedures as in Example 6 were followed except that the aminomonoazo compound obtained in step (A) of Example 6 was coupled with phenol in step (B) of Example 6, and the obtained diazo compound is butylated to prepare a desired product.

EXAMPLE 11

(A) 4.24 grams (0.02 mole) of 2-amino-5-n-butyl-thieno-[2,3-d]-thiazole were subjected to diazotization in the same manner as in Example 1. The diazo compound obtained was added dropwise at 10° C. over 30 minutes under stirring to a solution obtained by dissolving 16.7 grams (0.08 mole) of aniline-ω-sodium methanesulfonate having the formula

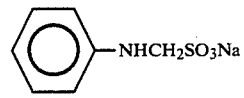

in 100 ml of 50% acetic acid aqueous solution. After the addition was completed, stirring was continued at the same temperature for another 2 hours. The resultant reaction mixture was stirred at 30° C. for 30 minutes, and was then poured into 500 ml of water. The precipitate was filtered and was rinsed with water. The obtained cake was added to 2% sodium carbonate aqueous solution and was heated at 65° C. for 2 hours and at 80° C. to 85° C. for 30 minutes. The mixture was cooled, filtered, and was vacuum-dried to provide a crude aminomonoazo compound having the formula:

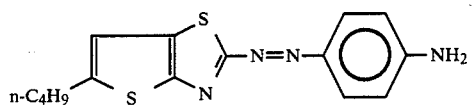

(B) The procedures of step (B) in Example 6 were followed except that the aminomonoazo compound obtained in step (A) was used to perform coupling with the N,N-diethylaniline, thus preparing the desired dichroic dye.

EXAMPLE 12

The same procedures as in Example 11 were followed except that the thienothiazole compound used to prepare the desired dichroic dye was 2-amino-5-benzyl-thieno-[2,3-d]-thiazole.

EXAMPLE 13

The same procedures as in Example 11 were followed except that the aminomonoazo compound obtained in step (A) of Example 11 was coupled with N-methyl-N-cyano-ethylaniline to prepare the desired dichroic dye.

EXAMPLE 14

The same procedures as in Example 11 were followed except that the aminomonoazo compound obtained in step (A) of Example 11 was coupled with N-ethyl-N-cyanoethylaniline to prepare the desired dichroic dye.

EXAMPLE 15

The same procedures as in Example 11 were followed except that the aminomonoazo compound obtained in step (A) of Example 11 was coupled with N-phenyl morpholine to prepare the desired dichroic dye.

EXAMPLE 16

The same procedures as in Example 11 were followed except that the aminomonoazo compound obtained in step (A) of Example 11 was coupled with phenol in step (B) of Example 11, and the obtained disazo compound is butylated to prepare a desired product.

EXAPLE 17

(A) 3.4 grams (0.02 mole) of 2-amino-5-methyl-thieno-[2,3-d]-thiazole were dissolved in 60 ml of a mixture of acetic acid with propionic acid in a weight ratio of 1:1. 5.9 grams (0.02 mole) of 43% nitrosylsulfuric acid were added dropwise to this mixture at a temperature of −10° C. to −5° C. for 30 minutes. After the addition was completed, stirring was continued at the same temperature for another hour to complete the diazotization. The resultant diazonium compound was added dropwise at 10° C. over 30 minutes under stirring to a solution obtained by dissolving 1.67 grams (0.08 mole) of aniline-ω-sodium methanesulfonate in 100 ml of 50% acetic acid aqueous solution. After the addition was completed, stirring was continued at the same temperature for another 2 hours. The reaction mixture was then stirred at 30° C. for 30 minutes, poured into 500 ml of water, filtered and rinsed with water. The obtained cake was added to 300 ml of 2% sodium hydroxide aqueous solution. After the mixture was heated at 65° C. for 2 hours and at 85° C. for 30 minutes, it was cooled, filtered, rinsed with water, and vacuum-dried. 4.5 grams of a crude aminomonoazo compound having the following formula were thus prepared:

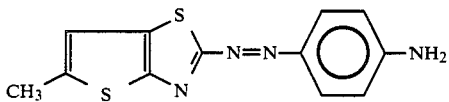

(B) 4.5 grams of the aminomonoazo compound were added to 200 ml of a mixture of acetic acid with propionic acid in a weight ratio of 1:1. The mixture was cooled to −10° C. to −5° C. 4.8 grams of 43% nitrosylsulfuric acid solution were added dropwise to this mixture under stirring. After the addition was completed, stirring was continued at the same temperature for another hour to complete the diazotization. The reaction mixture was added dropwise over an hour to a solution obtained by dissolving 12 grams of α-naphtylamine in 100 ml of a mixture of acetic acid with propionic acid in a weight ratio of 1:1. After the addition was completed, stirring was continued for another 3 hours. 100 ml of water were added to the reaction mixture, and the precipitate was filtered, rinsed with water, rinsed with 2% sodium carbonate aqueous solution, rinsed with water again, and vacuum-dried to provide 3.8 grams of a crude aminodisazo compound having the formula:

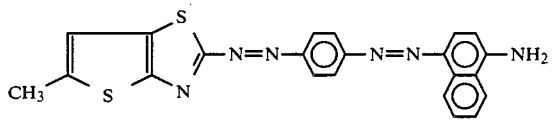

(C) 3.8 grams of the aminodisazo compound were ground in a mortar. The resultant powder was added to 200 ml of a mixture of acetic acid with propionic acid in a weight ratio of 1:1, and the mixture was cooled to 0° C. to −5° C. 2.6 grams of 43% nitrosylsulfuric acid were added dropwise to the cooled mixture over 10 minutes under stirring. After the addition was completed, stirring was continued for another hour to complete diazotization. The resultant diazo compound was added dropwise at 10° C. to a solution obtained by dissolving 12 grams of N,N-diethylaniline in 100 ml of acetic acid. After stirring for 3 hours, 200 ml of water were added. The precipitate was filtered, rinsed with water, and vacuum-dried. Two grams of the resultant crurde product were purified in the same manner as in Example 1 to provide 0.3 gram of the desired dichroic dye.

EXAMPLE 18

The same procedures as in Example 17 were followed except that, in step (A) of Example 17, 2-amino-5-n-propyl-thieno-[2,3-d]-thiazole was used as the thienothiazole compound to provide the desired dichroic dye.

EXAMPLE 19

The same procedures as in Example 17 were followed except that, in step (A) of Example 17, 2-amino-5-n-butyl-thieno-[2,3-d]-thiazole was used as the thienothiazole compound to provide the desired dichroic dye.

EXAMPLE 20

The same procedures as in Example 17 were followed except that, in step (A) of Example 17, 2-amino-5-n-benzyl-thieno-[2,3-d]-thiazole was used as the thienothiazole compound to provide the desired dichroic dye.

EXAMPLE 21

The same procedures as in Example 17 were followed except that the aminodisazo compound obtained in step (B) of Example 17 was coupled with N-methyl-N-cyano-ethylaniline in step (C) of Example 17.

EXAMPLE 22

The same procedures as in Example 17 were followed except that 2-amino-5-n-butyl-thieno-[2,3-d]-thiazole was used in step (A) of Example 17, and the obtained aminodisazo compound was coupled with N-methyl-N-cyano-ethylaniline in step (C) of Example 17.

EXAMPLE 23

The same procedures as in Example 17 were followed except that the aminodisazo compound obtained in step (B) of Example 17 was coupled with phenol in step (C) of Example 17, and the obtained trisazo compound was butylated to prepare a desired product.

EXAMPLE 24

The same procedures as in Example 23 were followed except that thienothiazole compound used was 2-amino-5-n-butyl-thieno-[2,3-d]-thiazole.

EXAMPLE 25

As in step (A) of Example 11, an aminomonoazo compound was prepared using 2-amino-5-methyl-thieno-[2,3-d]-thiazole, and the resultant aminomonoazo compound was coupled with aniline according to a similar manner to that in step (A) of Example 11 to prepare an aminodisazo compound. The aminodisazo compound was coupled with N,N-diethylaniline according to a similar manner to that in step (B) of Example 11 to prepare a desired trisazo compound.

EXAMPLES 26 to 28

The same procedures were followed as in Example 25, using 2-amino-thienothiazole compounds and H-Z as listed below in Table 2.

TABLE 2

| Example No. | Thienothiazole compound | H—Z |
| --- | --- | --- |
| 26 | 2-amino-5-n-butyl-thieno-[2,3-d]-thiazole | same as in Example 25 |
| 27 | same as in Example 25 | N—methyl-N—cyano-ethylaniline |
| 28 | same as in Example 25 | Phenol, followed by butylation |

Table 3 below shows the structural formulae of the dichroic dyes prepared in Examples 1 to 28 above and their characteristics (maximum absorption wavelength ($\lambda_{max}$), hue and dichroic ratio).

TABLE 3 - (1)

| Example No. | Structural formula | Maximum absorption wavelength (nm) | Hue | Dichroic ratio |
| --- | --- | --- | --- | --- |
| 1 | | 532 | Red | 8.6 |
| 2 | | 537 | Red purple | 8.0 |
| 3 | | 537 | Red purple | 8.3 |
| 4 | | 452 | Yellow | 7.3 |
| 5 | | 537 | Red purple | 6.5 |
| 6 | | 626 | Vivid blue | 8.4 |
| 7 | | 623 | Vivid blue | 8.7 |
| 8 | | 637 | Blue | 7.0 |
| 9 | | 661 | Bluish green | 8.0 |

TABLE 3 - (1)-continued

| Example No. | Structural formula | Maximum absorption wavelength (nm) | Hue | Dichroic ratio |
|---|---|---|---|---|
| 10 | n-C₄H₉-thienothiazole-N=N-phenyl(naphthyl)-N=N-C₆H₄-OC₄H₉ | 538 | Red purple | 8.0 |
| 11 | n-C₄H₉-thienothiazole-N=N-C₆H₄-N=N-C₆H₄-N(C₂H₅)₂ | 572 | Bluish purple | 9.8 |
| 12 | PhCH₂-thienothiazole-N=N-C₆H₄-N=N-C₆H₄-N(C₂H₅)₂ | 573 | Bluish purple | 8.6 |
| 13 | n-C₄H₉-thienothiazole-N=N-C₆H₄-N=N-C₆H₄-N(CH₃)(CH₂CH₂CN) | 543 | Reddish purple | 9.9 |
| 14 | n-C₄H₉-thienothiazole-N=N-C₆H₄-N=N-C₆H₄-N(C₂H₅)(C₂H₂CN) | 548 | Reddish purple | 9.4 |
| 15 | n-C₄H₉-thienothiazole-N=N-C₆H₄-N=N-C₆H₄-morpholino | 529 | Reddish purple | 10.2 |
| 16 | n-C₄H₉-thienothiazole-N=N-C₆H₄-N=N-C₆H₄-OC₄H₉ | 484 | Orange | 9.0 |
| 17 | CH₃-thienothiazole-N=N-C₆H₄-N=N-naphthyl-N=N-C₆H₄-N(C₂H₅)₂ | 600 | Bluish purple | 11.1 |
| 18 | n-C₃H₇-thienothiazole-N=N-C₆H₄-N=N-naphthyl-N=N-C₆H₄-N(C₂H₅)₂ | 603 | Blue | 10.8 |
| 19 | n-C₄H₉-thienothiazole-N=N-C₆H₄-N=N-naphthyl-N=N-C₆H₄-N(C₂H₅)₂ | 601 | Bluish purple | 10.8 |
| 20 | PhCH₂-thienothiazole-N=N-C₆H₄-N=N-naphthyl-N=N-C₆H₄-N(C₂H₅)₂ | 603 | Blue | 9.1 |
| 21 | CH₃-thienothiazole-N=N-C₆H₄-N=N-naphthyl-N=N-C₆H₄-N(CH₃)(CH₂CH₂CN) | 571 | Red purple | 11.3 |

TABLE 3 - (1)-continued

| Example No. | Structural formula | Maximum absorption wavelength (nm) | Hue | Dichroic ratio |
| --- | --- | --- | --- | --- |
| 22 | n-C4H9-[thienothiazole]-N=N-⌬-N=N-[naphthyl]-N=N-⌬-N(CH3)(CH2CH2CN) | 572 | Red purple | 11.0 |
| 23 | CH3-[thienothiazole]-N=N-⌬-N=N-[naphthyl]-N=N-⌬-OC4H9 | 515 | Red | 10.3 |
| 24 | n-C4H9-[thienothiazole]-N=N-⌬-N=N-⌬-N=N-⌬-OC4H9 | 516 | Red | 10.5 |
| 25 | CH3-[thienothiazole]-N=N-⌬-N=N-⌬-N=N-⌬-N(C2H5)2 | 546 | Red purple | 13.5 |
| 26 | n-C4H9-[thienothiazole]-N=N-⌬-N=N-⌬-N=N-⌬-N(C2H5)2 | 547 | Red purple | 3.2 |
| 27 | CH3-[thienothiazole]-N=N-⌬-N=N-⌬-N=N-⌬-N(CH3)(CH2CH2CN) | 518 | Red | 14.0 |
| 28 | CH3-[thienothiazole]-N=N-⌬-N=N-⌬-N=N-⌬-OC4H9 | 460 | Yellow | 13.3 |

Note that the characteristics of each dichroic dye shown in Table 3 above were obtained by using a liquid crystal material obtained by dissolving 0.1 to 5% by weight of dichroic dye in biphenyl-based liquid crystal E7 (a nematic liquid crystal having positive dielectric anisotropy) available from BDH Chemical Inc., and assembling the resultant liquid crystal material in a negative contrast guest-host effect liquid crystal display device, as shown in FIG. 1 which will be described below. The dyes may exhibit slightly different characteristics in guest-host effect liquid crystal devices of different types.

The dichroic dye comprising at least one compound having the general formula (I) has a high dichroic ratio, a high mole absorptivity, and a satisfactory display contrast when added even in a small amount to the liquid crystal. The dichroic dye further has good compatibility with the liquid crystal and does not precipitate at low temperatures. Therefore, when the dichroic dye of the present invention can be dissolved in various types of liquid crystal (host) to provide a liquid crystal device utilizing a guest-host effect. The device will provide a display with good contrast, has an excellent response time, and does not cause discoloration over time.

A host liquid crystal to be used with a dichroic dye of the present invention is not particularly limited. Examples of the liquid crystal that may be used in combination with the dichroic dye of the present invention include liquid crystals that are Schiff-based, azo-based, azoxy-based, ester-base, trans-cyclohexane-based, biphenyl-based, terphenyl-based, dioxane-based, pyrimidine-based liquid crystals and the line. Specific examples of such liquid crystals are disclosed in Akio Sasaki, "Liquid Crystals Bases and Applications", pp. 207 to 214, Ohm Inc., 1979, Tokyo. These liquid crystals can be used singly or in combination of more than one.

The dichroic dye of the present invention must be added to the selected host liquid crystal in an amount such that the addition thereof will not adversely affect the behavior of the liquid crystal molecules. The amount of the dichroic dye to be added preferably falls within the range of about 0.1 to 5% by weight based on the weight of the liquid crystal.

The dichroic dyes of the present invention can be added singly or in combination of more than one. The dichroic dye of the present invention can further be added in combination with another type of dichroic dye or with an isotropic dye. In either case, the total amount of the dye to be added to the liquid crystal is preferably not more than 5% by weight based on the weight of the liquid crystal.

Thus, the dichroic dye of the present invention can be used in various types of liquid crystal devices utilizing the guest-host effect.

FIG. 1 shows a negative contrast guest-host effect liquid crystal display device. A host liquid crystal 14 and a dichroic dye 15 of the present invention fill the space between a pair of electrode substrates 11 and 12 (wherein at least the electrode substrate 11 transmits light) which are adhered by a sealing material 13. The inner surfaces (i.e., the surface facing the liquid crystal) of the electrode substrates 11 and 12 are subjected to homogeneous orientation treatment. For this purpose, SiO is obliquely deposited on the inner surfaces of the electrode substrates 11 and 12. Alternatively, a polyimide resin is coated on the inner surfaces of the electrode substrates 11 and 12, and the coated resin layers are rubbed with a cotton fabric. The overall liquid crystal layer has a thickness of 10 μm. An external power source 16 is connected to the substrates 11 and 12 for applying an electric field thereto. A linear polarizer 17 for more increasing the display contrast is arranged on the outer surface of the electrode substrate 11 which faces the display screen. The axis of light transmission of the linear polarizer 17 is set to coincide with the molar axes of the liquid crystal and dye molecules which are homogeneously oriented.

In this guest-host effect liquid crystal display device, a biphenyl-based liquid crystal E7 from BDH Chemical Inc. was used as the host liquid crystal 14 and 0.7% by weight of dye No. 6 of Table 3 above was added as the dichroic dye 15 to the liquid crystal 14. When no voltage was applied to this device, vivid blue coloring was obtained. When a voltage of 3 V (32 Hz) was applied, the portion applied with the voltage became colorless. The dichroic dye dissolved in the host liquid crystal had a maximum absorption wavelength of 626 nm and a dichroic ratio of 8.4, providing a satisfactory display contrast. Furthermore, the dichroic dye had good compatibility with the host liquid crystal and did not precipitate at low temperatures. Dichroic dyes (Nos. 1 to 5 and Nos. 7 to 28) in Table 3 were also used in the guest-host liquid crystal display device of this type. The resultant maximum absorption wavelengths, hues and dichroic ratios of the respective dichroic dyes are as shown in Table 3. With any dichroic dye of the present invention, the device had a good contrast. These dichroic dyes also have high mole absorptivity and good compatibility with the host liquid crystal. Although the description was made with reference to 28 types of dichroic dye shown in Table 3, the present invention is not limited to these particular types. Thus, all of the dichroic dyes having the general formula (I) above have similar characteristics, and if two or more such dyes are used in a mixture, similar effects are still obtained.

Figure 2:
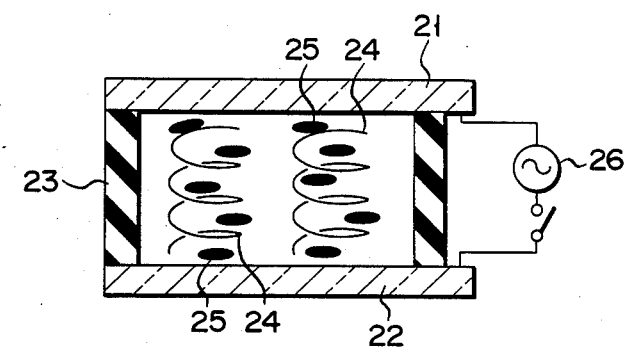
FIG. 2 is a representation showing a guest-host effect liquid crystal display device of a White & Tailor type.

FIG. 2 shows a White & Tailor type guest-host effect liquid crystal display device. A host liquid crystal 24 containing a known optically active substance and a dichroic dye 25 of the present invention fill the space between a pair of electrode substrates 21 and 22 (at least one of which can transmit light) which are adhered by a sealing material 23. The inner surfaces of the electrode substrates 21 and 22 are subjected to homogeneous orientation treatment, and the overall liquid crystal layer has a thickness of 10 μm. An external power source 26 is connected to the substrates 21 and 22 for applying an electric field thereto.

In this White & Tailor type guest-host liquid crystal display device, a mixture of 4-(2-methylbutyl)-4'-cyanobiphenyl (a chiral nematic liquid crystal) as an optically active substance and 3% by weight of the biphenyl liquid crystal E7 (the liquid crystal used in the display device of FIG. 1) was used as the host liquid crystal 24. 1% by weight of dichroic dye No. 1 of Table 3 above was used as the dichroic dye 25. When no voltage was applied, the obtained display device was colored in red. When a voltage of 6 V (32 Hz) was applied, the portion applied with this voltage became colorless. The dichroic dye had a maximum absorption wavelength of 532 nm and a dichroic dye ratio of 8.6. The device also had a good display contrast. In addition, the dichroic dye had excellent compatibility with the liquid crystal and did not precipitate at low temperatures (e.g. 25° C.).

The dichroic dye to be used in this White & Tailor type guest-host effect liquid crystal display device is not limited to the dye No. 1 but includes other dyes in Table 3, the dichroic dyes having the general formula (I), or mixtures thereof to provide a similar effect as above.

Figure 3:
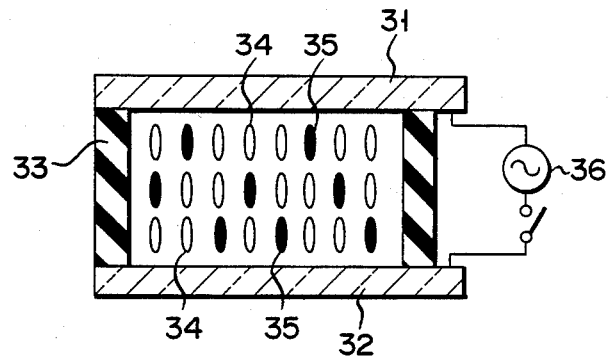
FIG. 3 is a representation showing a positive contrast guest-host effect liquid crystal display device.

FIG. 3 shows a positive contrast guest-host effect liquid crystal display device in which liquid crystal molecules are homeotropically aligned. A host liquid crystal 34 and a dichroic dye 35 of the present invention fill the space between a pair of electrode substrates 31 and 32 which are adhered by a sealing material 33. The inner surfaces of the substrates 31 and 32 are subjected to a homeotropic orientation treatment (the orientation agent can be, for example, a silane compound such as n-octadecyltriethoxysilane). The overall liquid crystal layer has a thickness of 10 μm. An external power source 36 is connected to the substrates 31 and 32 for applying an electric field thereto.

In this guest-host effect liquid crystal display device, a mixture of EN-24 (a nematic liquid crystal having negative dielectric anisotropy) as an optically active substance and 2% by weight of a chiral nematic liquid crystal having the following formula:

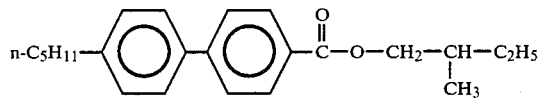

was used as the host liquid crystal 34. Dye No. 17 in Table 3 was used in the amount of 1.2% by weight as the dichroic dye 35. The display device was colorless when no voltage was applied thereto. However, the portion applied with a voltage of 3 V (32 Hz) became bluish purple. The dichroic dye in the host liquid crystal had a maximum absorption wavelength of 593 nm and a dichroic ratio of 10.3. The display had an extremely good display contrast. In addition, the dichroic dye had good compatibility with the liquid crystal and did not precipitate at low temperatures.

The dichroic dye to be used in this positive contrast guest-host effect liquid crystal display device is not limited to dye No. 17 but includes other dyes of Table 3, dichroic dyes having the general formula (I), or mixtures thereof to provide a similar effect as above.

Although the liquid crystal device of the present invention was described with reference to those shown in FIGS. 1 to 3, the present invention is not limited to these and can also be applied to liquid crystal light valves including liquid crystal shutter devices. Since a liquid crystal light valve has substantially the same configuration as those shown in FIGS. 1 to 3, it will not be illustrated. As a summary, the present invention can be applied to any liquid crystal device which has a pair of electrodes at least one of which is transparent; a liquid crystal material filled between the electrodes and comprising at least one liquid crystal and at least one dichroic dye according to the present invention dissolved in the liquid crystal; and means for applying a voltage between the pair of electrodes.

What is claimed is:

1. A method of controlling the transmission of light by a liquid crystal device, comprising:

providing a pair of opposed electrodes at least one of which is transparent;

providing a nematic liquid crystal material filled between said electrodes which has a predetermined absorption characteristic of light, said nematic liquid crystal material comprising at least one nematic liquid crystal and dichroic dye comprising at least one compound having the formula:

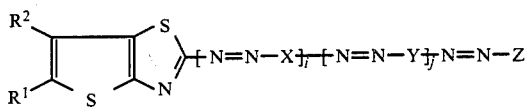

where:

each of X and Y is independently

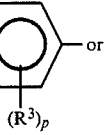

Z is

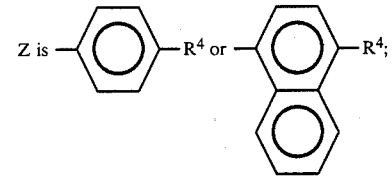

each of $R^1$ and $R^2$ is independently hydrogen, halogen, cyano, thiocyano, hydroxyl, mercapto, lower alkyl, fluorinated lower alkyl, lower alkylsulfonyl, fluorinated lower alkylsulfonyl, lower alkoxyl, lower alkylthio, —OR*—O—R⁰, —R*—OR⁰, lower alkylcarbonyl, lower acyloxy, lower alkoxycarbonyl,

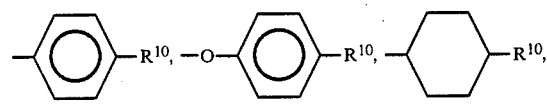

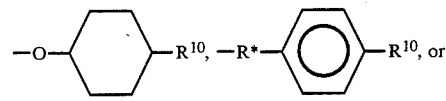

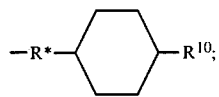

each $R^3$ is independently hydrogen, halogen, methyl, ethyl, methoxy, ethoxy, cyano or trifluormethyl;

each $R^4$ is independently

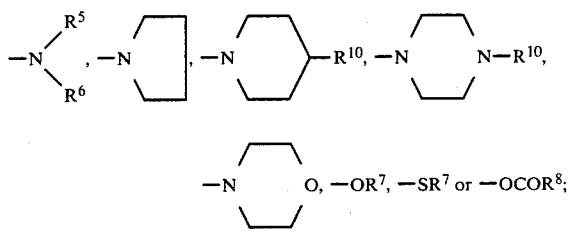

each of $R^5$ and $R^6$ is independently hydrogen, lower alkyl, lower hydroxyalkyl, halogenated lower alkyl, cyano-lower alkyl,

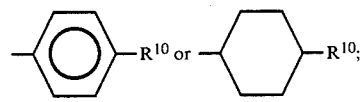

each $R^7$ is independently hydrogen, lower alkyl,

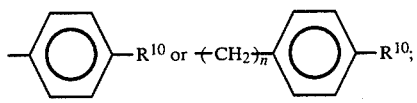

each $R^8$ is independently lower alkyl or

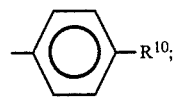

each $R^9$ is independently hydrogen or lower alkyl;
each $R^{10}$ is independently hydrogen, lower alkyl or lower alkoxyl;
each $R^0$ is independently lower alkyl;
each $R^*$ is independently lower alkylene;
i and j are each 0 or 1
P is an integer from 1 to 4; and
n is an integer from 1 to 8; and
applying a voltage between said pair of electrodes thereby changing said predetermined absorption characteristic of at least part of said liquid crystal material to control the transmission of light.

2. The method of controlling the transmission of light according to claim 1, wherein said compound has the formula:

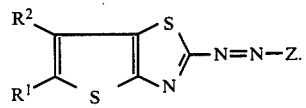

3. The method of controlling the transmission of light according to claim 2, wherein
each $R^4$ is independently $-OR^7$ or $-OCOR^8$;
each $R^7$ is independently hydrogen, lower alkyl,

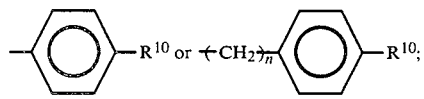

each $R^8$ is independently lower alkyl or

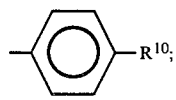

each $R^{10}$ is independently lower alkyl or lower alkoxyl;
each $R^0$ is independently lower alkyl;
each $R^*$ is independently lower alkylene; and
n is an integer from 1 to 8.

4. The method of controlling the transmission of light according to claim 1, wherein said compound has the formula:

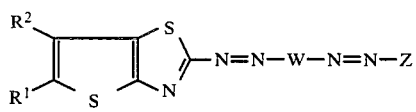

where W is the X or Y.

5. The method of controlling the transmission of light according to claim 4, wherein said compound has the formula:

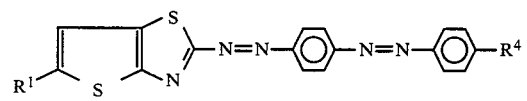

where:
$R^1$ is hydrogen, lower alkyl, fluorinated lower alkyl, cyano or

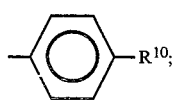

$R^4$ is

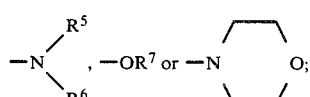

each of $R^5$ and $R^6$ is independently lower alkyl, halogenated lower alkyl or cyano-lower alkyl; and
$R^7$ is lower alkyl.

6. The method of controlling the transmission of light according to claim 4, wherein said compound has the formula:

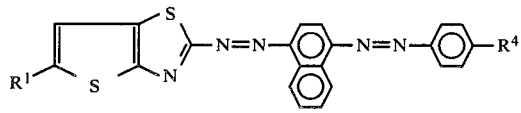

where:
$R^1$ is hydrogen, lower alkyl, fluorinated lower alkyl, cyano or

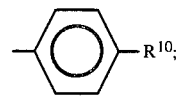

$R^4$ is

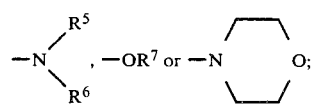

each of $R^5$ and $R^6$ is independently lower alkyl, halogenated lower alkyl or cyano-lower alkyl; and
$R^7$ is lower alkyl.

7. The method of controlling the transmission of light according to claim 1, wherein said compound has the formula:

$$R^2 \underset{R^1}{\underset{|}{\diagdown}} \underset{S}{\overset{S}{\diagup}} \underset{N}{\diagdown} -N=N-X-N=N-Y-N=N-Z.$$

8. The method of controlling the transmission of light according to claim 7, wherein said compound has the formula:

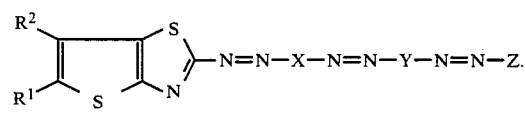

where:
$R^1$ is hydrogen, lower alkyl, fluorinated lower alkyl, cyano or

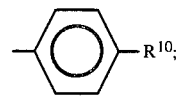

$R^4$ is

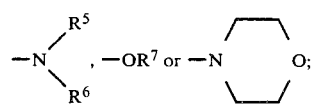

each of $R^5$ and $R^6$ is independently lower alkyl, halogenated lower alkyl or cyano-lower alkyl; and
$R^7$ is lower alkyl.

9. The method of controlling the transmission of light according to claim 7, wherein said compound has the formula:

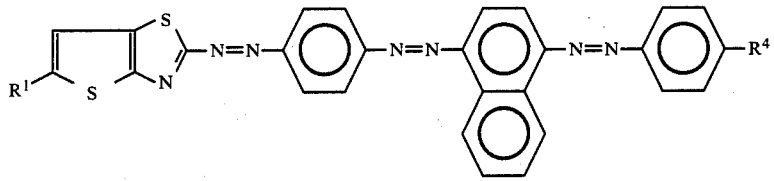

wherein:
$R^1$ is hydrogen, lower alkyl, fluorinated lower alkyl, cyano or

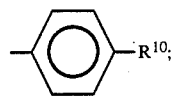

$R^4$ is

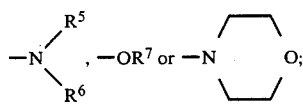

each of $R^5$ and $R^6$ is independently lower alkyl, halogenated lower alkyl or cyano-lower alkyl; and
$R^7$ is lower alkyl.

10. A liquid crystal device utilizing a guest-host effect, comprising:
a pair of opposed electrodes at least one of which is transparent;
a nematic liquid crystal material filled between said electrodes and comprising at least one nematic liquid crystal and a dichroic dye comprising at least one compound having the generla formula:

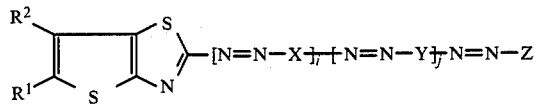

where:

each of X and Y is independently

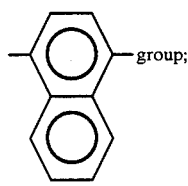

Z is

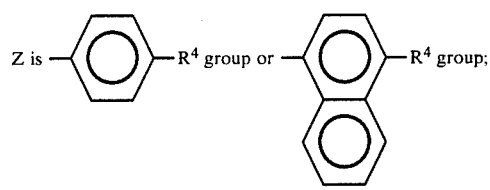

each of $R^1$ and $R^2$ is independently hydrogen atom, a halogen atom, cyano group, thiocyano group, hydroxyl group, mercapto group, a lower alkyl group, a fluorinated lower alkyl group, a lower alkylsulfonyl group, a fluorinated lower alkylsulfonyl group, a lower alkoxyl group, a lower alkylthio group, —OR*—O—$R^0$ group, —R*—$OR^0$ group, a lower alkylcarbonyl group, a lower acyloxy group, a lower alkoxycarbonyl group,

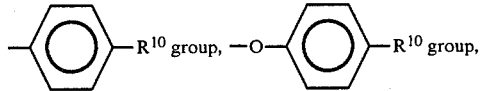

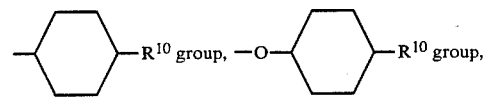

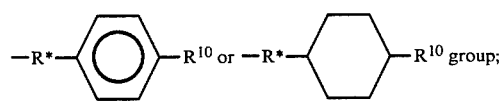

each $R^3$ is independently hydrogen atom, a halogen atom, methyl group, ethyl group, methoxy group, ethoxy group, cyano group or trifluoromethyl group;
each $R^4$ is independently

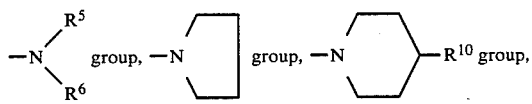

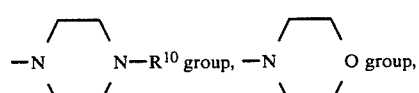

—$OR^7$ group, —$SR^7$ group or —$OCOR^8$ group;

each of $R^5$ and $R^6$ is independently hydrogen atom, a lower alkyl group, lower hydroxyalkyl group, a halogenated lower alkyl group, a cyano-lower alkyl group, —R*—$COOR^9$ group, —R*—$OCOR^9$ group, —⟨phenyl⟩—R¹⁰ group or —⟨cyclohexyl⟩—R¹⁰ group;

each R⁷ is independently hydrogen atom, a lower alkyl group,

—⟨phenyl⟩—R¹⁰ group or —(CH₂)ₙ—⟨phenyl⟩—R¹⁰ group;

each R⁸ is independently a lower alkyl group or

—⟨phenyl⟩—R¹⁰ group;

each R⁹ is independently hydrogen atom or a lower alkyl group;
each R¹⁰ is independently hydrogen atom, a lower alkyl group or a lower alkoxyl group;
each R⁰ is independently a lower alkyl group;
each R* is independently a lower alkylene group;
i and j are each 0 or 1;
p is an integer from 1 to 4;
n is an integer from 1 to 8; and
means for applying a voltage between said pair of electrodes.

11. The liquid crystal device according to claim 10, wherein said compound has the formula:

[thiazole structure with R¹, R² substituents]—N=N—Z

12. The liquid crystal device according to claim 11, wherein
each R⁴ is independently —OR⁷ or —OCOR⁸;
R⁷ is independently hydrogen, lower alkyl, —⟨phenyl⟩—R¹⁰ or —(CH₂)ₙ—⟨phenyl⟩—R¹⁰;

each R⁸ is independently lower alkyl or

—⟨phenyl⟩—R¹⁰;

each R¹⁰ is independently lower alkyl or lower alkoxyl;
each R⁰ is independently lower alkyl;
each R* is independently lower alkylene; and
n is an integer from 1 to 8.

13. The liquid crystal device according to claim 10, wherein said compound has the formula:

[thiazole structure with R¹, R²]—N=N—W—N=N—Z where W is the X or Y.

14. The liquid crystal device according to claim 13, wherein said compound has the formula:

[thiazole structure with R¹]—N=N—⟨phenyl⟩—N=N—⟨phenyl⟩—R⁴ where:
R¹ is hydrogen, lower alkyl, fluorinated lower alkyl, cyano or

—⟨phenyl⟩—R¹⁰;

R⁴ is

—N(R⁵)(R⁶), —OR⁷ or —N⟨morpholine⟩O;

each of R⁵ and R⁶ is independently lower alkyl, halogenated lower alkyl or cyano-lower alkyl; and
R⁷ is lower alkyl.

15. The liquid crystal device according to claim 13, wherein said compound has the formula:

[thiazole structure with R¹]—N=N—⟨naphthyl⟩—N=N—⟨phenyl⟩—R⁴ where:
R¹ is hydrogen, lower alkyl, fluorinated lower alkyl, cyano or

—⟨phenyl⟩—R¹⁰;

R⁴ is

—N(R⁵)(R⁶), —OR⁷ or —N⟨morpholine⟩O;

each of R⁵ and R⁶ is independently lower alkyl, halogenated lower alkyl or cyano-lower alkyl; and
R⁷ is lower alkyl.

16. The liquid crystal device according to claim 10, wherein said compound has the formula:

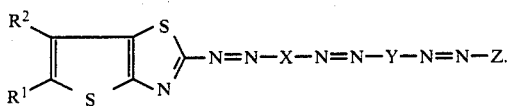

17. The liquid crystal device according to claim 16, wherein said compound has the formula:

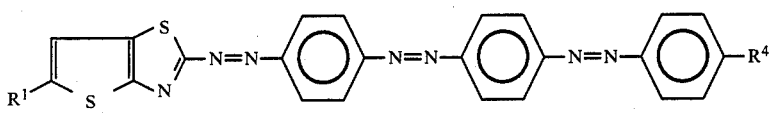

where:
R¹ is hydrogen, lower alkyl, fluorinated lower alkyl, cyano or

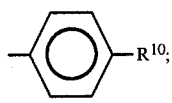

R⁴ is

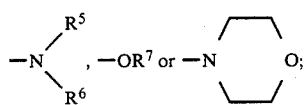

each of R⁵ and R⁶ is independently lower alkyl, halogenated lower alkyl or cyano-lower alkyl; and
R⁷ is lower alkyl.

18. The liquid crystal device according to claim 16, wherein said compound has the formula:

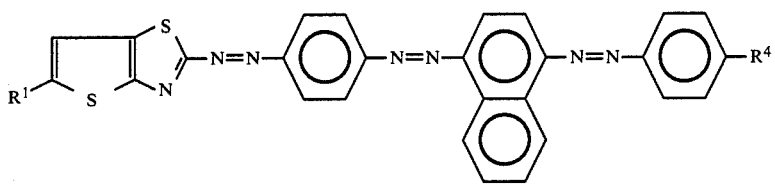

where:
R¹ is hydrogen, lower alkyl, fluorinated lower alkyl, cyano or

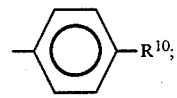

R⁴ is

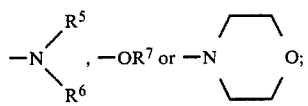

each of R⁵ and R⁶ is independently lower alkyl, halogenated lower alkyl or cyano-lower alkyl; and
R⁷ is lower alkyl.

* * * * *